United States Patent [19]

Melber et al.

[11] Patent Number: 5,342,689

[45] Date of Patent: * Aug. 30, 1994

[54] THERMOPLASTIC MICROSPHERES

[75] Inventors: George E. Melber, Buffalo; Leon E. Wolinski, Cheektowaga, both of N.Y.; William A. Oswald, Darien, Ill.

[73] Assignee: Pierce & Stevens Corporation, Buffalo, N.Y.

[*] Notice: The portion of the term of this patent subsequent to May 9, 2006 has been disclaimed.

[21] Appl. No.: 965,030

[22] Filed: Oct. 23, 1992

Related U.S. Application Data

[62] Division of Ser. No. 490,332, Mar. 8, 1990, Pat. No. 5,180,752.

[51] Int. Cl.$^5$ .............. B01J 13/22; C08J 9/16; C08J 9/224
[52] U.S. Cl. ............ 428/402.22; 264/4.3; 264/4.33; 428/402.21; 521/56; 521/57; 521/920
[58] Field of Search .................. 264/4.3, 4.33; 428/402.21, 402.22; 521/56, 57, 920

[56] References Cited

U.S. PATENT DOCUMENTS

| | | | |
|---|---|---|---|
| 3,444,104 | 5/1969 | Immel et al. | 521/57 |
| 3,669,899 | 6/1972 | Vassiliades et al. | 428/402.24 X |
| 4,029,613 | 6/1977 | Quinlan et al. | 521/57 |
| 4,268,411 | 5/1981 | Iwata et al. | 428/402.2 |
| 4,397,799 | 8/1983 | Edgren et al. | 264/53 |
| 4,513,106 | 4/1985 | Edgren et al. | 521/58 |
| 4,722,943 | 2/1985 | Melber et al. | 521/57 |
| 4,771,079 | 9/1988 | Melber | 521/54 |
| 4,829,094 | 5/1989 | Melber et al. | 521/57 |
| 4,898,894 | 2/1990 | Melber et al. | 521/57 X |
| 5,180,752 | 1/1993 | Melber et al. | 521/57 |

FOREIGN PATENT DOCUMENTS 3273673 10/1988 Japan .................. 521/56

Primary Examiner—Richard D. Lovering
Attorney, Agent, or Firm—Waldron & Associates

[57] ABSTRACT

Microsphere wet cake is mixed with a surface barrier coating effective to prevent agglomeration and surface bonding of the microspheres, and removing water by drying with continuous mixing at high shear. In a subsequent step, by the control of the application of heat and balancing temperature and low shear mixing, it is possible to also control expansion of the microspheres.

The surface barrier coating in the present invention is any one of a wide diversity of materials which meet the requirements of the intended function, i.e., to prevent the agglomeration of the microspheres during the process. Suitable materials include, by way of example, dry inorganic pigments or filler materials, and the like, and related organic materials.

5 Claims, 1 Drawing Sheet

THERMOPLASTIC MICROSPHERES

This is a division of application Ser. No. 07/490,332, filed Mar. 8, 1990, now U.S. Pat. No. 5,180,752.

I. BACKGROUND OF THE INVENTION

A. INTRODUCTION

The present invention relates to the drying of microspheres, and to the dry expansion of microspheres.

Microspheres are heat expandable thermoplastic polymeric hollow spheres containing a thermally activatable expanding agent. Such materials, the method of their manufacture, and considerable information concerning the properties and uses of microspheres, are all set forth in U.S. Pat. No. 3,615,972, issued to Donald S. Morehouse. Other teachings concerning such materials and uses are found in, for example, U.S. Pat. Nos. 3,864,181; 4,006,273; and 4,044,176.

In following the teachings of the Morehouse patent, the microspheres are made in an aqueous system by the limited coalescence process under pressure, and the resulting product is a "wet cake" of the unexpanded microsphere beads wetting agents and water. The wet cake is typically about 40 to 75 weight percent solids, and because of the wetting agents employed in the formation of the beads, the surface will be wet. Separation of water and beads has not been a simple process.

Many important uses of the microspheres require the removal of the water, to produce dry, free flowing microsphere beads. It is usual to pre-expand the beads before use. In unexpanded form, the dry microsphere beads typically have a displacement density of about 1.1 g/cm$^3$. Dry, expanded microspheres typically have a density by displacement generally of less than 0.06 g/cm$^3$, and are highly useful in the production of syntactic foams in a wide variety of polymer matrices. Dry, free-flowing, pre-expanded microspheres have now achieved a commercial recognition and market demand for such uses and others.

B. PRIOR ART

There have been to date few procedures by which dry expanded microspheres have been produced from wet cake. Dry free-flowing unexpanded microsphere beads have not heretofore been widely available except as a laboratory curiosity, and no commercially practicable procedure for producing such a product has as yet emerged, particularly because of the costs and limited quality of the products.

The techniques in the prior art for the production of expanded microspheres are limited in at least one of two aspects: either the product remains wet, or the expanded beads are produced in dry form with substantial amounts of agglomeration and a limited degree of expansion. The "acceptable" levels of agglomeration achieved in such procedures are in the range of about 3 to 10% of the product.

In U.S. Pat. No. 4,397,799, pre-expanded, dry, low density microspheres are produced by spray drying. The spray drying procedure has several disadvantages. First and foremost, the erection of a dedicated spray drying facility is required, representing a very substantial capital investment, and very considerable operating expenses, particularly for skilled labor and utilities costs in heating the drying fluid. In addition, the product is produced entrained in a heated, moving fluid stream, and the requirements of collection, recovery and handling are considerable. In addition, it is generally not feasible to produce the expanded product at the point of use, because of the size and expense of the facility, so that the spray drying approach largely mandates shipping of large volumes at considerable expense. Not to be neglected is the requirement that the spray drying be conducted under an inert atmosphere, since the usual blowing agents entrained within the microspheres are generally highly flammable, and often explosive. The usual procedure is to employ nitrogen as the spray drying fluid, with a necessary, and highly expensive safety burden on the system. Recovery of the expanded beads from the system is also demanding, not only to avoid product losses, but also because of the dust pollution of the working environment and atmosphere that can result. In addition, experience has shown that the spray drying technique is suited for developing expanded densities no less than about 0.032 to about 0.040 g/cm$^3$ and typically about 0.036 g/cm$^3$. Attempts at lower densities result in unacceptable levels of agglomeration, greater than about 10% of the product, and equally unacceptable product losses attributable to overexpansion, with attendant disruption of the bead structure.

Expansion of microsphere beads is attained in the process of U.S. Pat. No. 4,513,106, where the wet cake is injected into a flow stream of steam, which is subsequently quenched in cool water. This produces pre-expansion of the microspheres, but still wet with water, at low solids content. While solids contents as high as fifteen percent have been occasionally been produced, the typical product is more often about 3 to 5 percent solids. The water limits the applications to which the procedure is applicable.

In our prior patent, U.S. Pat. No. 4,722,943, we disclosed a process wherein wet cake mixed with a processing aid, dried and expanded in an integral operation. In that invention, the processing aid is adhered to and embedded in the surface of the microspheres by thermal bonding, wherein the surface of the microspheres is heated to a temperature above the glass transition temperature, $T_g$, so that the polymer material behaved as a hot melt adhesive to bind the processing aid. The equipment requirements for such operations are quite substantial, the procedure is difficult to control, and the quality and uniformity of the product are difficult to maintain. When carefully controlled, the product is within the limits heretofore considered "acceptable", with agglomeration levels in the range of 3 to 10%. While the procedure of our prior patent achieved a material reduction in capital costs and operating expenses to achieve acceptable product quality, it would be desirable to reduce costs still further and to achieve higher levels of quality and productivity. It would also be desirable to achieve greater expansion of the microspheres and to permit the use of lower proportions of the adherent surface barrier coating upon which the procedure is dependent. Experience has shown that when the microspheres are greater than 30% by weight of the mixture, the avoidance of acceptable levels of agglomeration becomes increasingly difficult with increasing proportions of microsphere beads. This has proved a serious problem, since it is product which is lowest in the proportion of the surface barrier coating and composite density which for the majority of uses is the more desired product.

C. OBJECTS OF THE INVENTION

It is an object of the present invention to provide a process for drying and expanding of thermoplastic microspheres from wet cake.

It is another object of the present invention to provide a process for producing dry, free flowing microsphere beads substantially free of agglomerates.

A further object is to provide dry, pre-expanded microspheres from wet cake.

It is also an object of the present invention to provide dry, free-flowing expanded microspheres, by a process which is reasonably inexpensive to capitalize and operate, which can be provided at the site of use of the product at economical levels of utilization, and which can be operated with modest labor and utility costs.

It is an object of the present invention to provide dry, free-flowing expanded microspheres having unusual and unique properties and characteristics.

II. SUMMARY OF THE INVENTION

In the present invention, microsphere wet cake is dried and expanded with an adherent coating of a surface barrier coating by a procedure which results in the attainment; of lower density than heretofore attainable, as low as 0.015 to 0.020 g/cm$^3$, and with materially reduced proportions of agglomerates in the product, even at the highest proportions of microsphere beads, generally less than 1% of the product, and often less than 0.1%.

The procedure of the present invention is based on separate and distinct sequential steps of first mixing and drying of the microspheres and the surface barrier coating, under conditions of relatively high shear, and then expanding the dry microspheres to the desired density and causing the surface barrier coating to thermally bond to the surface thereof.

The discovery of the benefit of separating the drying operation from the expansion step has resulted in unforeseen benefits, particularly the reduction of agglomeration, even at the lowest levels of surface barrier coating, quite substantially below the levels heretofore achieved, and the reduction of capital and operating costs to lower levels at high product quality. Surprisingly, the high shear conditions imposed during the drying operation do not disrupt the microsphere structure. Equally surprising, agglomeration does not occur to any substantial degree in the expansion operation.

IV. DETAILED DISCLOSURE

Figure 1:
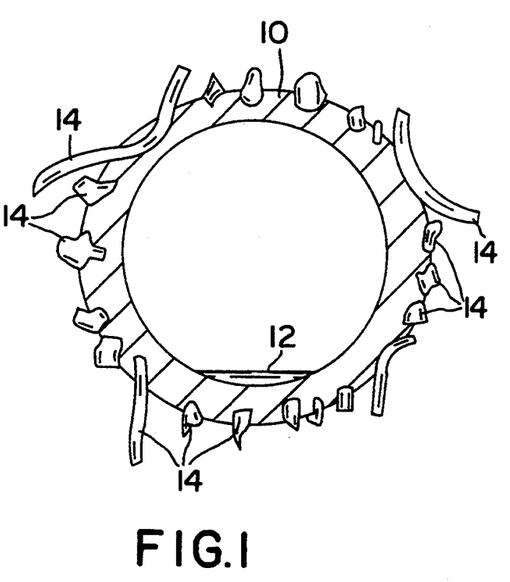
FIG. 1 is a schematic representation of the appearance of a microsphere of the present invention after drying and expansion, showing the microsphere with particles of surface barrier coating adhered on the surface thereof.
Figure 2:
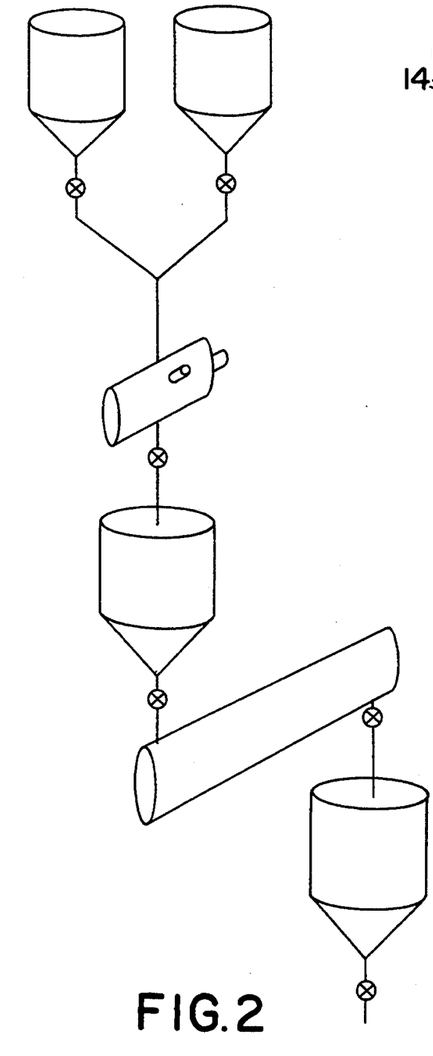
FIG. 2 is a schematic flow diagram showing the drying operation of the present invention as described in Example I, infra.

The most common uses of expanded, dry microspheres resides in the blending of these materials into a polymer binder system as a constituent in syntactic foam formulations. The exceptional ultra-low density characteristics has led to drastic changes in the ways in which the weight and volume relationships of such materials are considered. As a general rule of thumb, the addition of one percent by weight of the expanded microspheres will represent the substitution of about twenty percent by volume in typical systems.

The characteristics of the microspheres have precluded many approaches to their drying and pre-expansion. Severe agglomeration and adherence of the materials to warm surfaces of equipment have eliminated most approaches to such procedures from serious consideration. Wet expansion in steam is of limited use when dry microspheres are needed, and the spray drying procedure is so expensive, and the product so prone to excessive, and extremely difficult, dusting problems, along with substantial agglomeration and limited expansion of the beads, that the effective development of the potential markets has been limited by such factors.

The procedure of our prior U.S. Pat. No. 4,722,943, requires relatively expensive equipment and is subject to periodic disruptions of product uniformity and quality because of the need to achieve early thermal bonding of a processing aid to the surfaces of the microsphere beads, and the attendant agglomeration or collapse of an unacceptable high proportion of the beads and a lack of uniformity in the product.

The occurrence of agglomerates has heretofore been considered the result of the microsphere expansion. Even by the procedure of our prior patent, supra, it has been considered necessary to accept a level of agglomerates of from about 3 to 10 percent of the expanded beads, and in some conditions, far higher levels are common. We have now found, however, that a major contributing factor in the occurrence of agglomerates is to be found in the characteristics of the wet cake and the shortcomings of the expansion and drying procedures heretofore employed. We have learned that the wet cake must be subjected to adequate levels of mixing at high shear during the drying operation to assure complete separation of beads prior to the expansion in order to reduce agglomeration.

Our discovery of the significance of high shear mixing dictates that the mixing and drying operation be completed in a separate and distinct step prior to expansion. This "complication" of the processing operation had led to other discoveries and substantial benefits that are achieved in the present invention. While these are set out in more detail, infra, they can be summarized as follows:

1. Expansion to lower densities than heretofore achieved is now possible. The microsphere density can be less than 0.03, often 0.02 to 0.015 g/cm$^3$.

2. Lower proportions of the surface barrier coating can now be employed without a resulting increase in the proportion of agglomerates in the product as heretofore expected.

3. Closer control of the bead expansion is achieved, resulting in lower proportions of under-expanded, over-expanded and disrupted beads.

4. Process control requirements are simpler and equipment requirements are less demanding, permitting operation in less expensive equipment with reduced control requirements while still achieving higher levels of product quality, uniformity and productivity.

5. The level of agglomerates consistently achieved, of less than 1%, often maintained at less than 0.1%, of the product has now permitted the elimination of post-expansion processing to separate out agglomerates from the product.

6. The combination of all the foregoing result in materially reduced production costs with materially increased product quality, and a broad range of product than heretofore available.

It has now been observed that surface barrier coatings can be employed, in surprisingly modest proportions by weight, which prevent agglomeration of the microspheres upon both drying and expansion, and that such materials actively and effectively suppress dusting of the expanded products as well. This combination of features and observations has led to the development of effective drying, and subsequent expansion, of microspheres by first mixing and drying the microspheres with the surface barrier coating until substantially all the free water is removed, followed by controlled expansion to a desired density and recovery of the dry, free-flowing product. The microspheres remain in the desired unicellular condition, and substantially free of undesirable agglomeration. The subsequent expansion can be up to the higher limits, as established by prior efforts in the art, to achieve microsphere densities less than 0.03 g/cm$^3$, and as low as 0.015 to 0.02 g/cm$^3$.

It is important to the present invention that in the context of most uses of the dry, expanded microspheres, it is the volumetric considerations which are most often of dominant importance, so that even quite substantial proportions of the surface barrier coatings on a weight basis form a negligible or very minor component on a volumetric basis. For example, employing talc as the surface barrier coating, the volume and weight relationships of the dry, expanded microspheres with varying amounts of talc show the relationships detailed in TABLE I.

TABLE I

| EXPANDED MICROSPHERES BLENDED WITH TALC MICROSPHERE CONTENT OF PRODUCT | |
|---|---|
| WEIGHT % | VOLUME % |
| 80 | 99.8 |
| 50 | 99.3 |
| 20 | 97.1 |
| 10 | 93.8 |
| 5 | 87.7 |
| 3 | 80.7 |

NOTES:
Data are based on Microspheres at 0.02 g/cm$^3$ and the talc at 2.70 g/cm$^3$.

As the relationships in Table I show, even quite large proportions of talc by weight represent a minor fraction of the volume of the dry expanded product. Particularly since it is possible to find such materials as entirely conventional fillers and/or pigments in many polymer systems of interest for the use of the microspheres, it is generally preferred to employ such materials as the surface barrier coatings in the present invention. It is also of interest to employ fibrous forms of such materials, as well as reinforcing fillers, as particularly preferred surface barrier coatings when possible, for their added benefits as constituents of the final syntactic foams. It will often be advantageous to employ both particulate and fibrous surface barrier coatings, or more than one type of surface barrier coating in mixtures and combinations with one another.

In most uses of the dry expanded microspheres, such materials will often be a constituent of the formulation intended by the end user in any event, and it is simply necessary to make corresponding reductions in the loading of such fillers and pigments in the formulation to compensate for the increment included with the microspheres. A wide diversity of such materials will meet the functional requirements of the present invention, so that it is possible in almost all circumstances to find a surface barrier coating compatible with the formulating requirements of the intended end use.

It has been observed that with appropriate levels of such surface barrier coatings, the tendency of the microspheres to agglomerate, or to stick to heated surfaces of drying equipment and expanding equipment is effectively eliminated, and the dusting of the final expanded product is materially reduced, if not effectively eliminated.

By the achievement of the processing characteristics of the mixture, it has become possible to employ equipment that permits effective drying and subsequent expansion at temperatures where the need for an inert atmosphere is eliminated without the introduction of substantial fire and explosion hazards. This represents a quite material reduction in expense, and a real gain in system safety.

As those of ordinary skill in the art will readily recognize, there are a substantial number of parameters which govern the method and the products produced in the present invention. Each of the significant parameters is hereafter discussed in turn in relation, to the present invention.

Microspheres are generally available in the form of a wet cake, which is typically about 40 percent water, about 60 percent unexpanded microsphere beads,, and minor additional amounts of the materials employed in the manufacture of the beads by the process of the Morehouse patent, i.e., "wetting agents."

The most readily available microspheres are those available from Pierce & Stevens Corporation, 710 Ohio Street, P.O. Box 1092 Buffalo, N.Y. 14240-1092, which are predominately polyvinylidene chloride microspheres with an inclusion of isobutane as the blowing agent. Some of the microspheres presently available contain comonomers in minor proportions in the bead polymerization. The available materials are preferred in the present invention, primarily for their availability and reasonable cost. The co-polymers generally have higher $T_g$ and expansion temperatures.

As the Morehouse patent indicates, microspheres can be made from a rather wide diversity of thermoplastic polymers. In practice, the commercially available microspheres are generally limited to polyvinylidene chloride or a random copolymer, vinylidene chloride and acrylonitrile, or a random terpolymer of polyvinylidene chloride, acrylonitrile, and divinyl benzene. Microspheres of other materials, such as polyacrylonitrile, polyalkyl methacrylates, polystyrene, or vinyl chloride, are known, but these materials are not widely and generally available. The present invention is applicable to any thermoplastic of which microspheres is made, but since the polyvinylidene chloride based materials are those most available to the art, the discussion herein will be directed predominantly to those materials. As those of ordinary skill in the art will readily recognize, the processing parameters will require adjustment to accommodate differing polymer materials.

A wide variety of blowing agents can be employed in microspheres. Again, the commercially available materials are more limited in range, most often being selected from the lower alkanes, particularly propane, butane, pentane, and mixtures thereof, suited to the polyvinylidene chloride polymer. As the Morehouse patent clearly sets forth, the selection of the blowing agent is a function of the particular thermoplastic polymer employed, and in the context of the present discussion, those ordinarily used with the commercially available microspheres are given the greatest attention. Isobutane is most often used with polyvinylidene chloride microspheres.

In unexpanded form, the microspheres can be made in a variety of sizes, those readily available in commerce being most often on the order of 2 to 20 microns, particularly 3 to 10 microns. When expanded, these materials will have bead diameters on the order of 10 to 100 micrometers. It is possible to make microspheres in a wider range of sizes, and the present invention is applicable to them as well. It has been demonstrated, for example, that microspheres can be made from as small as about 0.1 micron, up to as large as about 1 millimeter, in diameter, before expansion. Such materials are not generally available.

While variations in shape are possible, the available microspheres are characteristically spherical, with the central cavity containing the blowing agent being generally centrally located.

Dry, unexpanded microspheres typically have a displacement density of just greater than 1 g/cm$^3$, typically about 1.1.

When such microspheres are expanded, they are typically enlarged in diameter by a factor of 5 to 10 times the diameter of the unexpanded beads, giving rise to a displacement density, when dry, of 0.1 or less, most often about 0.03 to 0.06. In the present invention is now possible to achieve expanded densities as low as 0.015 to 0.020 g/cm$^3$.

While the microspheres are produced in an aqueous suspension, it is common to break and de-water the suspension, and to supply the microspheres in the form of a "wet cake" of about sixty percent solids. This avoids shipping larger than necessary quantities of the aqueous system.

The solids content of the wet cake is substantially all unexpanded microspheres, but also includes the suspension components, including the wetting agents, so that the remaining water in the wet cake is extremely difficult to remove.

The drying operation in the present invention is based on the use of conventional contact type, indirect heat exchange mixing driers with high speed, high shear capabilities. A wide diversity of types of equipment are applicable. In general terms, the requirements are for good temperature control, good mixing of powder and granular materials, and high shear, optionally with operation at reduced pressure provided, and the removal and recovery, preferably with condensation of the evaporated water and entrained blowing agent and wetting agents. Active cooling of the microspheres, either in the mixing drier itself, or in ancillary equipment is also optional.

We believe, although we have no wish to be bound thereby, that the occurrence of agglomerates in processes not employing high shear is the result of adhesion between microsphere beads caused by the action of the wetting agents at higher concentrations as water is removed. Once agglomerates are formed, the wetting agents are "sheltered" from the drying operation and serve to bind pluralities of beads together in a firmly adherent clump. We suggest that the adhesive bond formed is rather weak, and is effectively broken when subjected to high shear; additional water is then freed for removal, and remaining increments of such materials no longer have adhesive properties, so that agglomerates do not reform.

The measurement of shear in fluidized systems is a complex matter, and difficult to measure directly. Where the breaking of agglomerates of particles is desired, it is known that the "smearing" action produced under laminar flow conditions is more effective than the results of turbulent flfow. Such milling of particulates is practiced in a diversity of arts and is generally well known.

In liquid-solid systems, it is well known to employ Reynolds numbers to evaluate grinding and mixing conditions. Where the laminar flow conditions are desirable for optimum pigment grinding into a paint vehicle, for example, it is recommended that the Reynolds number of the mixing not exceed 2,000.

In the context of the present invention, involving the mechanical fluidizing of solids in a gas phase (i.e., air), such parameters are less well developed, but we have observed that operations under similar criteria, i.e., Reynolds number is calculated of less than 2,000, correlate well with the objectives. Specific equipment is discussed below.

Reynolds numbers are a dimensionless value given by the following equation:

$$Re = \frac{\rho v X}{\eta}$$

where $\rho$=density (g/cm$^3$), $v$=velocity (cm/sec). $X$=linear dimension (cm), and $\eta$—viscosity (poise). In the preferred mixing equipment based on a rotating disk mill, the linear dimension X is the shortest distance from the mixing chamber wall to the disk blade, in a direction normal to the plane of the disk.

Broadly speaking, the present invention may be practiced over a wide range of Reynolds numbers, from as low as about 1,000, up to as high as 8,000 or even about 10,000. As those of ordinary skill in the art will recognize, it will generally be desirable to operate at Re of from about 1,000 to about 3,000, and preferably about 1,500 to about 2,250. It is most preferred, when such conditions can be achieved in the equipment employed, to operate at or just below a value of Re=2,000, say from about 1,800 to 2,000.

At calculated Reynolds numbers materially above or below the preferred values, the present invention remains effective, but less efficient, requiring longer preocessing times and/or tolerance of somewhat higher proportions of agglomerates in the product. The outer limits are defined by shear forces so low that agglomerates are not reduced during processing or so high that the bead structure is disrupted by the impact of the blade tips.

Because of the turbulence effected by the plow mixer in the mechanicaly fluidized mixing operation, true laminar flow is often not achieved in the present operation. We have observed, as a consequence, that the range of desirable Reynolds numbers to achieve effective results is rather broader than in simpler systems where true laminar flow conditions can be achieved.

There is a great diversity of mixing driers available, at almost any desired scale of operations which meet the foregoing criteria with a capability of either batch or continuous operation in the context of the present invention. As a general rule batch operation is less expensive.

The surface barrier coating in the present invention is any one of a wide diversity of materials which meet the requirements of the intended function. It is required that the surface barrier coating be a free flowing solid at the temperature and pressure of the drying operation, that it not react chemically with the microspheres, or with the other constituents of the system, e.g. the wetting agents and related components of the wet cake and, at the temperature of the expansion, that it function to separate the microspheres undergoing expansion so that they do not come into contact and bond to one another.

The surface barrier coating may be selected from one or more components meeting the following general characteristics:

The barrier coating material should be a finely divided particulate or fibrous material. It may be spherical or irregular in shape, and it may be a solid or a hollow particle.

The barrier coating material should be a free-flowing solid under the processing conditions of the present invention. It should have a melting point, for example, above the temperature of the drying process, generally above about 250° C.

The barrier coating material must be finely divided enough to be able to effectively blend with and adhere to the surfaces of the microspheres. The maximum major dimension of the particle size should preferably be no larger than about the diameter of the expanded microspheres, and preferably less. The minor dimensions will generally be as small as possible, commonly having a de facto lower limit of effectively about 0.01 micrometers.

While the barrier coating material may be either organic or inorganic, there are ordinarily considerable advantages to the employment of inorganic materials as at least a substantial component of the surface barrier coating. Such materials are commonly available in the dimensions of interest, they are common inclusions along with the microspheres in a wide diversity of syntactic foam formulations, they pose few problems in compounding and formulating end uses of the microspheres, and they are generally less-expensive. It is also generally easier to assure that the barrier coating material does not itself develop undesirable characteristics in the processing, i.e., by becoming tacky itself or the like.

The surface barrier coatings are desirably materials which are pigments, reinforcing fillers, or reinforcing fibers in polymer formulations and thus are commonly used in the formulations where the microspheres are to be used. For example, talc, calcium carbonate, barium sulfate, alumina, such as particularly alumina trihydrate, silica, titanium dioxide, zinc oxide, and the like may be employed. Other materials of interest include spherical beads, or hollow beads of ceramics, quartz, glass or polytetrafluoroethylene, i.e., TEFLON®, or the like. Among the fibrous materials of interest are glass fibers, cotton flock, polyamide fibers, particularly aromatic polyamides such as Nomex® and Kevlar®, carbon and graphite fibers and the like. Conductive surface barrier coatings, such as conductive carbon, copper or steel fibers, and organic fibers with conductive coatings of copper or silver or the like are also of particular use. All these are typical and illustrative of the commonly employed materials in syntactic polymer foam compositions, and those of ordinary skill in the art will be familiar with others that can also be suitably employed.

The selection of suitable surface barrier coatings among the wide diversity of materials that meet the general characteristics required of such materials is generally a matter of balancing a number of functional requirements in the procedure of the invention and in the context of the intended uses of the product. Among the criteria that will guide those of ordinary skill in the art are the following:

The primary function of the surface barrier coating is to prevent the microspheres from coming into direct contact with one another and with the surfaces of the processing equipment during expansion and thus to prevent them adhering. The barrier coating material becomes thermally bonded to the surface of the microspheres, and forms a barrier between the thermoplastic material and any other materials with which it might otherwise come into contact.

When the present invention is being conducted for a particular, known end use, it is ordinarily possible to tailor the selection of the surface barrier coating to the requirements of use. It is generally desirable to consider the surface barrier coating as a unit for unit replacement for the same material in the intended use. As those of ordinary skill in the art will readily recognize, the fact that the surface barrier coating will adhere to the surface of the microspheres may be a factor that will require adjustment of proportions, but such requirements will not ordinarily be substantial or critical.

When combinations of different materials are employed as the surface barrier coating, it is possible to stay within the compounding requirements of virtually any designed formulation.

By virtue of the higher density of the surface barrier coating than that of the expanded microspheres, the composite product has a greatly reduced tendency to become entrained in gas streams or in the environmental atmosphere. As those of ordinary skill in the art will readily appreciate, the tendency to dusting is a material safety hazard, both in terms of exposure to workers and in terms of fire and explosive hazards. Since the microspheres contain an alkane blowing agent in substantial proportions, large quantities of these materials in the atmosphere presents a substantial problem in some circumstances. These difficulties, and the effort and expense of their resolution are minimized or eliminated altogether in the present invention.

Generally, the greater the density of the surface barrier coating, and the greater its proportion in the composite, the greater the reduction in the dusting problem. Since the major proportion of the product on a weight basis is often the surface barrier coating, addition of a high density surface barrier coating to the system can effectively eliminate any dusting problems.

By virtue of the increased density of the composite, the demands on the processing equipment and system in recovering the expanded and dried microspheres is greatly facilitated, and product losses are substantially reduced.

The surface barrier coating is used in the present invention in an amount sufficient to permit the expansion of the microspheres without sticking to the equipment employed or forming agglomerations of microspheres. While this amount will vary depending on the particular equipment employed, and with the particular processing conditions, the surface barrier coating will most often be in the range of about 20 to 97 weight percent of the mixture of barrier coating material and microspheres, on a dry weight basis. As a general rule, in most circumstances the amount employed should be the least amount that will reliably and consistently achieve the defined function of the barrier coating material. It is generally preferred that the barrier coating material be employed in amounts less than 90 and preferably less than 80 weight percent of the blend. This normally results in a dry expanded product which is more than 90 volume percent microspheres.

Since the predominant concerns in most uses of microspheres is with the volumetric proportions, even quite considerable proportions by weight of the surface barrier coating can be included without detriment in many end uses. When substantial amounts of the surface barrier coating are introduced as a component of the microsphere formulation, appropriate allowances for this component should be made in the compounding of materials.

An excess of the minimum amount of surface barrier coating required to prevent agglomeration may be employed when desired, but it is generally desirable to avoid proportions substantially greater than the amount which will adhere to the surface of the microspheres.

In the present invention, drying of the microspheres is accomplished by heating with active high speed, high shear mixing, optionally at low pressure, in the presence of the surface barrier coating. The term heating is employed in the present application to connote heating or drying involving procedures other than direct heat exchange in a heated fluid, particularly not in a heated gas stream. Contact drying processes employing indirect heat exchange are generally well known, but in the context of the present invention, must be adapted to accommodate the particular and unusual conditions of operation, as described infra.

The drying operation is conveniently conducted in a plow mixer, such as those available from Littleford Bros., Inc., of Florence, Ky. These mixers produce the high speed, high shear mixing required to achieve complete dispersion and intermixing of the microspheres and the surface barrier coating, and provides the heat exchange capacity to effectively remove the water from the mix. The mixer is vented to provide for removal of water and other volatiles under reduced pressure or vacuum.

In the present invention, the use of high shear mixing is employed in the drying and mixing step. In prior processes, high shear was avoided to prevent rupture of the microsphere beads, particularly at higher temperatures employed to soften the surface of the beads to achieve expansion. We have observed that at the lower temperatures employed for the drying operation, the beads are not ruptured at quite substantial shear levels.

In the drying equipment employed in the present disclosure, for example, a six inch rotating blade or disk mill ordinarily operated at about 3600 rpm, producing a tip velocity of about 5,600 ft/min (about 86 meters/sec.) is conveniently employed projecting into the mixing chamber. Such high speed mills are generally familiar to those of ordinary skill in the art. In operation, the plow mixer operates to "mechanically fluidize" the blend, and to transport the materials throughout the mixing chamber, including into the high speed mill.

We observe that the operation of the plow mixer without the high speed mill is generally not sufficient to eliminate agglomerates in the final product. With the high speed mill, the product is obtained substantially free of agglomerates, i.e. agglomerates constitute less than 1%, and often less than 0.1%, of the total product.

It will be clear to those of ordinary skill in the art that the term "high shear" as employed in the present invention is ultimately a functional term, signifying a level at least sufficient to eliminate aggregates in the dried product, and less than the level at which significant disruption of the beads occurs. Specific values of the minimum and maxima will be dependent on the specific equipment employed and the particular conditions of its usage and operation.

The plow mixer is operated at temperatures below which expansion occurs, affording exceptional control over the process. When mixing and drying are complete, the surface barrier coating will form a substantially homogeneous blend with the microsphere beads substantially free of agglomeration.

The equipment selected for use must, rather evidently, provide for adequate heat transfer to remove substantially all the water from the feed stock. The significant control parameters for any given equipment will be residence time, pressure, and heat input, normally based on operating temperature for convenience. At the residence time and pressure employed, heat exchange sufficient to achieve water removal within the constraints of the temperature limitations of the microspheres, and must remain below the temperature at which expansion occurs or at which the surface of the microspheres become tacky. Most equipment of interest will be adapted to receive steam as a heat source, which may be conveniently employed to assure temperature, typically of at least about 10° to 15° C. below the $T_g$ of the bead polymer. Longer retention times are wasteful and unnecessary but are not detrimental to the microsphere product.

It is one of the unique features of the present invention that the microsphere beads can be dried and blended with the surface barrier coating in a mixture substantially free of agglomerates. This has not been possible in any effective process in the prior art. Such a result is achieved by drying at temperatures below that at which the microspheres soften, and where the internal pressure of the blowing agent is less than that needed to cause expansion, combined with the high shear mixing. Since the microspheres typically expand at temperatures on the order of about 120° C., drying can proceed effectively at lower temperatures.

It is possible to conduct the drying operation at reduced pressure to accelerate the rate of the water removal, although not always required. Thus, in the present invention pressures from ambient to as low as 1 mm Hg absolute have been employed with success. As those of ordinary skill in the art will readily recognize, the balancing of time, temperature, and pressure can be readily adapted to the substantially complete removal of the water, low pressure drying is not mandatory for low temperature operations at which the expansion of the microspheres does not occur.

In a separate, subsequent operation, the microspheres in dry, free flowing form and blended with the surface barrier coating are expanded to the required density. The microsphere component can be expanded to a density as low as about 0.015 grams per cubic centimeter.

By separating the expansion step from the mixing and drying operations, far simpler and more reliable control of operations is achieved in far simpler and less expensive equipment, with far higher productivity.

The expansion can be carried out in any convenient equipment, in either batch or continuous operations suited to effect heat transfer to the microspheres. Since the adherence of the surface barrier coating is achieved at expansion temperatures, and since the water, was previously removed, only the thermal requirements for expansion need to be considered and controlled.

It has been found that the homogeneous blend produced in the drying mixture can be expanded with low shear mixing to aid in uniform and efficient heat transfer by indirect heat exchange in very simple and inexpensive equipment. High speed, high shear mixing is not required in the expansion operation, so long as the drying step has reduced agglomerates and achieved sufficient homogeneity in the blend.

While the expansion can be conducted in the plow mixer employed in the drying operation, it will generally be desirable to expand, continuously if desired, in faster, less expensive equipment. Suitable for such use are the Solidaire ® continuous heat transfer units available from Bepex Corporation of Rolling Meadows, Ill.

The expansion equipment must provide the energy for the expansion alone. This is not large, and in most circumstances achieving a bead temperature (depending on the specific polymer) at which expansion occurs, as previously defined, there will be little difficulty in attaining the desired degree of expansion. In most circumstances, full expansion is desired, i.e., to a microsphere density of less than 0.03 g/cm$^3$, preferably about 0.02 g/cm3 (without the surface barrier coating).

The important temperature limitations are defined by the thermoplastic polymer. It is important not to melt the polymer mass, so that the hollow spherical structure is lost through over expansion. On the other hand, if the temperature is not high enough to soften the polymer and to develop an adequate pressure of the blowing agent, expansion may not occur, or may be insufficient. Residence time at the appropriate temperature is also a useful control parameter, since there is a definite duration of the expansion process. Even when adequate temperatures are achieved, if the residence time at temperature is too short, the expansion may be insufficient. If the time is too long, the microspheres themselves may be over-expanded and disrupted, leaving broken spheres and polymer fragments and grit in the product, with attendant losses of production. While heat transfer rates are generally dependent on the specific equipment employed, residence times on the order of 0.5 to 3 minutes are often sufficient.

The temperatures for expansion are generally near, but not materially above, the glass transition temperature of amorphous materials and the melting temperature of crystalline polymers. These matters are discussed in more detail in the Morehouse patent.

It is the function of the surface barrier coating to prevent the formation of aggregates of the microspheres to the maximum attainable degree. In most equipment this particular requirement is facilitated by the use of continuous, low shear mixing of the material in the expander. Effective mixing also promotes even and uniform heat transfer to the particulate materials.

The degree of expansion can range from substantially none, to the known limits of expansion. This parameter is determined by the temperature, the residence time at temperature, and to a lesser degree, by the pressure in the system.

Expansion requires that the blowing agent develop a substantial internal pressure (as compared with the external pressure), and that the polymer become softened enough to flow under the effect of the internal pressure. This generally means that the polymer must be heated to a point near its melting or glass transition temperature, or very slightly above, typically about 120°. If the polymer temperature is too high, the microspheres will over-expand, burst, and collapse. The upper limit of temperature should be about 180° for the co-polymer beads, and preferably no higher than 150° for polyvinylidene chloride. At these higher temperatures, the residence time at temperature should be brief.

As the temperature is raised to the point at which the microspheres begin to soften and expand, and their surface area becomes tacky, the surface barrier coating bonds to the surface and prevents agglomeration, and good mixing operates to maximize the extent of heat transfer to the microspheres at this stage in the process. The extent of the mixing is not narrowly critical, so long as the mixing maintains a uniform, substantially homogeneous blend of surface barrier coating and microspheres and relatively even heat transfer is obtained.

It is generally preferred to permit the dried and expanded microspheres to cool before they are collected and packaged or otherwise handled. This minimizes the degree to which handling can disrupt the bead structure while the polymer is in the plastic state. Active cooling may be employed if desired.

The resulting dry microspheres can be conveniently recovered from the expander, collected and handled by entirely conventional procedures and equipment usually employed in such operations for dealing with powdered or granular materials.

The result of the process is the production of a unique form of the microspheres. The microspheres will have an adherent surface deposit of the surface barrier coating. When an excess of the surface barrier coating is used, there may be an additional amount of free material entrained in, but not bound to the surface of the microspheres. In most contexts, such a condition is not desired, and in usual operations is to be avoided. The particulate or fibrous material may form a discontinuous layer on the surface, or in other circumstances may completely coat the surface in a substantially continuous layer. By varying the proportions of the barrier coating material and the microspheres, either condition may be attained.

The microspheres of the present invention will often have a low incidence of deformed, non-spherical shapes when compared to the dried and expanded microspheres from the processes of the prior art. It has been found that the level of disrupted microspheres, where the hollow structure with a continuous form is broken, are not frequent, and are as low or even lower than the norms of the prior art processes.

The microspheres of the present invention are a dry, free-flowing powder, ordinarily having less than about one weight percent moisture. Because there will still be a residuum of the "wetting agents" remaining from the limited coalescence process by which the microspheres were made, the product will be slightly hygroscopic, and unless protected from ambient moisture, will gradually take up additional water. The materials involved are not so strongly hygroscopic, however, that this is a large problem. In most circumstances, unprotected microspheres will tend to stabilize at a water content of about 1.5 weight percent or less. The microspheres will remain a free flowing powder even under such conditions.

The microsphere product of the present invention can be expanded to very near the limit of expandability, i.e., to a density of less than about 0.03, often 0.02 or even 0.015 g/cm$^3$. Higher densities are also possible. When the barrier coating material is taken into account, the composite density will, of course, be higher. Thus the composite density of the product will be determined by the density of the particular barrier coating material employed, the amount of the barrier coating material included, and the degree of expansion. Those of ordinary skill in the art will be able to readily determine the composite density of the product from the information and guidance provided in the present disclosure.

Most importantly, the dry expanded beads of the present invention will have less than one percent, and often less than 0.1 percent agglomerates. In the present invention, this signifies that at least about 99 percent of the product, and preferably at least about 99.9 percent, will pass a 100 mesh screen. This compares to the prior art dry expanded beads produced by our prior method or by spray drying where acceptable results have represented product wherein from 3 to 10 percent is retained on an 80 mesh screen, while only about 97 percent, and often as little as 90 percent will pass a 100 mesh screen. In many circumstances, particularly when the microspheres exceed about 30 weight percent of the blend, even higher levels of agglomerates, well in excess of 10 percent of the product, may be retained on the 80 mesh screen by the prior art procedures. In the present invention, the very low level of agglomerates is attained up to 80 percent by weight (in excess of 99 percent by volume). Such low proportions of the surface barrier coating may be highly desirable in some applications of the product.

The foregoing description is general in scope. For the particular guidance of those of ordinary skill in the art, the following specific examples are intended to provide particular demonstrative guidance in the practice of the present invention.

EXAMPLE I

Polyvinylidene chloride microsphere wet cake and talc were charged to Littleford FM-130D batch mixers in a dry weight ratio of 15 parts micropsheres to 85 parts talc.

The microspheres were commercially available from Pierce & Stevens Corp. as Expancel 551 WU, and are characterized as having an expanded diameter of 50 microns at a displacement density of 0.036 g/cm$^3$, and in the wet cake contain about 40% water.

The talc had a particle size of about 5 microns.

A total of 3.0 cubic feet were charged to the mixer.

The mixer was heated with hot water at 160° F., and a vacuum of 26"±1 was drawn and maintained. The plow mixer was operated at 450 rpm while the high speed mill was operated at 3600 rpm.

After 45 minutes, the mixer was stopped and the blend of microspheres and talc was found to be a dry, free flowing, homogeneous blend containing less than 1% water by weight. The blend was entirely free of visible agglomerates.

The blend was charged to a storage hopper, and the batch process was repeated under the same conditions until a total of 600 pounds had been produced and charged to the hopper.

The blend was expanded in a Bepex Solidaire 8-4 horizontal paddle mixer. The paddle rotor speed was held to 900 rpm, and the heating jacket was supplied with dry steam at 330° F.

The 600 pound blend was fed through the mixer over a period of one hour with an average resisdence time in the expanded of 2 minutes. Discharged product was collected in a hopper.

The product was examined and found to have the following chracteristics:
Less than 0.1 percent retained on a 100 mesh screen
Composite displacement density 0.12 g/cm$^3$
Calculate microsphere density 0.02 g/cm$^3$
Percent sinkers<1%
Water content<1% by weight
Water content after two weeks<2%
Bulk density 2.95 lb/ft$^3$ Sinkers are the amount of material which do not float when the beads are mixed with water. The materials that sink are unbound barrier coating material, polymer fines resulting from disrupted beads, and high density agglomerates.

Upon microscopic examination, it was observed that the expanded microspheres had an even, substantially continuous surface coating of talc particles adhered over the surface. No agglomerates and no ruptured beads were observed.

EXAMPLES II-IX

The procedure of Example I was repeated using differing feed materials and varying conditions of the procedures as noted herein. The same equipment was employed as in Example I.

All the microspheres employed are available from Pierce & Stevens Corporation, Buffalo, N.Y.

All the surface barrier coating materials are commercially available materials offered by numerous producers.

TABLE II

| | Feed Materials | | | | | |
|---|---|---|---|---|---|---|
| Example | Microspheres | Water (% wt) | Diameter[4] | Coating Material | Particle Size[5] | Weight Ratio |
| II | F-80[1] | 25 | 50 | talc | 5 | 15:85 |
| III | F-80 | 25 | 50 | CaCO$_3^-$ | 5 | 15:85 |
| IV | F-80 | 25 | 50 | CaCO$_3$ | 5 | 15:85 |
| V | F-80 | 25 | 50 | Al$_2$O$_3$.3H$_2$O | 7 | 15:85 |
| VI | 551-WU[2] | 35 | 50 | CaCO$_3$ | 10 | 15:85 |
| VII | F-30GS[3] | 44 | 15 | TiO$_2$ | 2 | 30:70 |
| VIII | 551-WU | 35 | 50 | CaCO$_3$ | 10 | 15:85 |
| IX | F-80 | 25 | 50 | talc | 5 | 15:85 |

[1]F-80 is the description of a high temperature, styrene resistant microsphere formed of a random terpolymer of vinylidene chloride, acrylonitrile and divinyl benzene. The recommended expansion temperature is 170° C.
[2]551-WU is the designation for a polyvinylidene chloride microsphere. The recommended expansion temperature is 130° C.
[3]F-30GS is a high temperature, styrene resistant microsphere of a vinylidene chloride/acrylonitrile/ divinyl benzene terpolymer. The recommended expansion temperature is 170° C.
[4]Diameter is the nominal average expanded dimension at 0.036 g/cm$^3$ density.
[5]Particle size is reported average for commercially available materials, in microns.

TABLE III

| | Drying | | | | |
|---|---|---|---|---|---|
| Example | Vac. | Temp. °F. | Plow RPM | Mill RPM | Water % |
| II | 24–28 | 170 | 600 | 3600 | <1 |
| III | 24–28 | 170 | 600 | 3600 | <1 |
| IV | 24–28 | 170 | 600 | 3600 | <1 |
| V | 24–28 | 170 | 600 | 3600 | <1 |
| VI | 24–28 | 170 | 600 | 3600 | <1 |
| VII | 24–28 | 170 | 600 | 3600 | <1 |
| VIII | 24–28 | 170 | 600 | 3600 | <1 |
| IX | 24–28 | 170 | 600 | 3600 | <1 |

TABLE IV

| | Expansion | | | | |
|---|---|---|---|---|---|
| Example | Rate lb/hr | Steam Temp. °F. | Rotor RPM | Bulk Density | % Agglomerates |
| II | 353 | 348 | 500 | 2.86 | <0.1 |

TABLE IV-continued

| Example | Rate lb/hr | Steam Temp. °F. | Expansion Rotor RPM | Bulk Density | % Agglomerates |
|---|---|---|---|---|---|
| III | 442 | 360 | 500–700 | 3.4 | <0.1 |
| IV | 252 | 359 | 700–900 | 4.03 | <0.1 |
| V | 459 | 359 | 950 | 3.71 | <0.1 |
| VI | 592 | 330 | 950 | 3.8 | <0.1 |
| VII | 331 | 310 | 914–1123 | 11.5–20.4 | <0.1 |
| VIII | 600 | 330 | 950 | 2.53 | <0.1 |
| IX | 640 | 331 | 950–1000 | 2.83 | <0.1 |

VI. CLAIMS

What is claimed is:

1. A dry, free-flowing expanded microsphere product comprising thermoplastic microspheres expanded to a density of less than about 0.03 g/cm$^3$ and a thermally bonded coating of an adherent surface barrier coating material.

2. The microsphere product of claim 1 wherein said microspheres are expanded to a density of from about 0.015 g/cm$^3$ to about 0.02 g/cm$^3$.

3. The microsphere product of claim 1 wherein said surface barrier coating material is a free flowing particulate or solid having a softening or melting point at a temperature above that of said thermoplastic.

4. The microsphere product of claim 1 wherein said surface barrier coating material is a member selected from the group consisting of talc, calcium carbonate, barium sulfate, alumina, silica, titanium dioxide, zinc oxide, ceramic beads, quartz beads, glass beads, poly(tetrafluoroethylene) beads, glass fibers, cotton fibers, polyamide fibers, and mixtures thereof.

5. Free-flowing dry expanded microspheres with a coating of adherent surface barrier coating, said microspheres being substantially free of agglomerates, made by the steps of:

A. first mixing and drying an admixture of expandable thermoplastic microsphere wet cake and a surface barrier coating material for a time and at a temperature less than sufficient to expand said microspheres and sufficient to reduce the water content of said admixture to less than about one weight percent, said mixing at shear sufficient to disrupt substantially all microsphere agglomerates in said wet cake, said surface barrier coating material is a free-flowing particulate or fibrous solid having a softening or melting point at a temperature above that of said thermoplastic;

B. thereafter expanding said microspheres by heating the admixture for a time and temperature sufficient to cause expansion thereof and to thermally bond said surface barrier coating to the surfaces thereof; and C. collecting free-flowing dry microspheres with an adherent coating of said surface barrier coating and substantially free of agglomerates.

* * * * *